(12) United States Patent
Hosokawa et al.

(10) Patent No.: US 7,713,037 B2
(45) Date of Patent: May 11, 2010

(54) PUMP APPARATUS

(75) Inventors: Masayuki Hosokawa, Hirakata (JP);
Fumihiro Shintaku, Takarazuka (JP)

(73) Assignees: Amtec Co., Ltd., Osaka-shi (JP);
Shimada & Co., Ltd., Osaka-shi (JP);
Ibuki Kogyo Co., Ltd., Osaka-shi (JP)

( * ) Notice: Subject to any disclaimer, the term of this patent is extended or adjusted under 35 U.S.C. 154(b) by 1601 days.

(21) Appl. No.: 10/946,102

(22) Filed: Sep. 22, 2004

(65) Prior Publication Data

US 2005/0207922 A1   Sep. 22, 2005

(30) Foreign Application Priority Data

Mar. 16, 2004   (JP)   ............................. 2004-074832

(51) Int. Cl.
*F04B 7/00*      (2006.01)
*F04B 23/00*     (2006.01)
(52) U.S. Cl. ..................... 417/510; 417/502; 210/637; 210/652
(58) Field of Classification Search ................ 417/502, 417/510; 210/137, 637, 652; 277/437
See application file for complete search history.

(56) References Cited

U.S. PATENT DOCUMENTS

| 3,558,242 | A | * | 1/1971 | Jenkyn-Thomas | 417/374 |
| RE32,144 | E | * | 5/1986 | Keefer | 210/637 |
| 5,531,887 | A | * | 7/1996 | Miers | 210/135 |
| 6,139,750 | A | * | 10/2000 | Graham | 210/652 |

FOREIGN PATENT DOCUMENTS

JP   3-21208 B2   3/1991

\* cited by examiner

*Primary Examiner*—Devon C Kramer
*Assistant Examiner*—Patrick Hamo
(74) *Attorney, Agent, or Firm*—Birch, Stewart, Kolasch & Birch, LLP (57) ABSTRACT

In a pump apparatus of the present invention, a portion of fluid sent to a fluid-sending destination is circulated to a pumping driving chamber on one side of a cylinder through a circulation passage. The pump apparatus includes a switching valve which switches inflow and outflow of the circulated fluid with respect to the pumping driving chamber. The switching valve is connected to a piston rod through a link mechanism, and mechanically carries out the switching operation using a pumping driving force.

5 Claims, 9 Drawing Sheets

PUMP APPARATUS

CROSS-REFERENCE TO RELATED APPLICATION

This application is related to Japanese application No. 2004-74832 filed on Mar. 16, 2004, whose priority is claimed under 35 USC §119, the disclosure of which is incorporated by reference in its entirety.

BACKGROUND OF THE INVENTION

1. Field of the Invention

The present invention relates to a pump apparatus and, more particularly, to a pump apparatus capable of obtaining a high discharge pressure with a low driving pressure and is used when seawater or dirty water is allowed to pass through a semipermeable membrane, e.g., a reverse osmosis membrane to obtain drinking water.

2. Description of the Related Art

Figure 8:
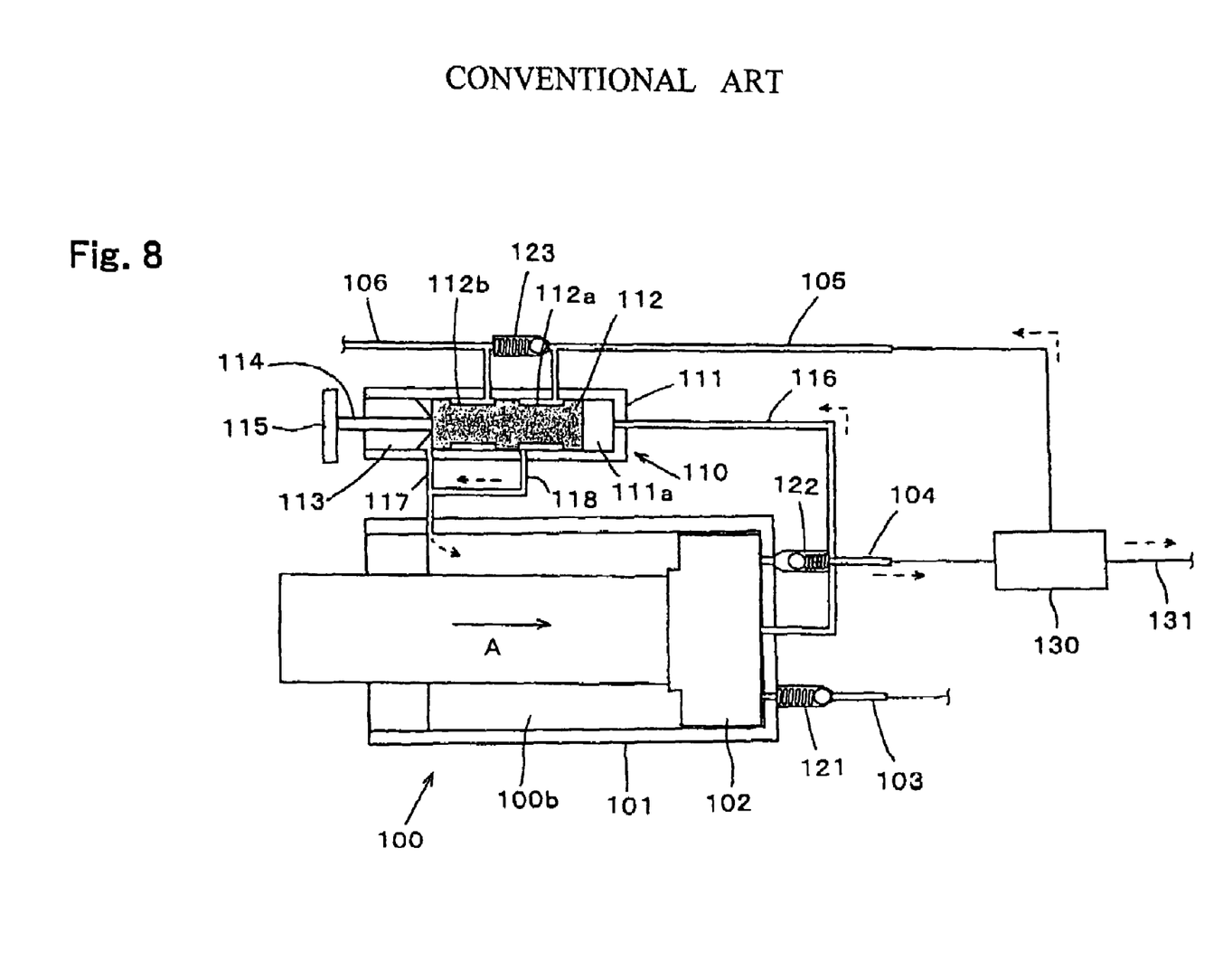
FIG. 8 is a schematic block diagram of a conventional pump apparatus showing a main piston when it is moved down.
Figure 9:
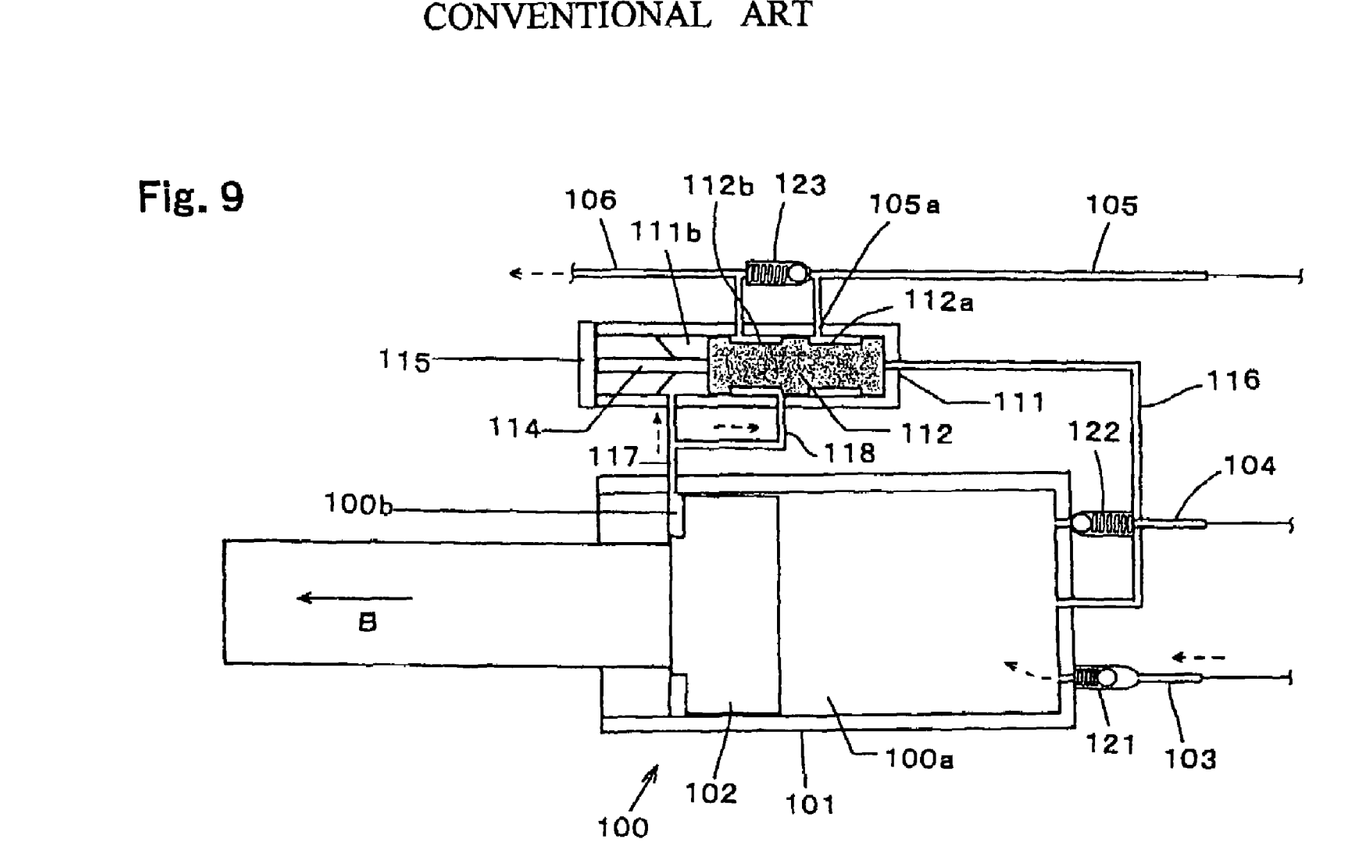
FIG. 9 is a schematic block diagram of the conventional pump apparatus showing the main piston when it is moved up.

As shown in FIGS. 8 and 9, a conventionally known pump apparatus (e.g., JP-B 3-21208 (1991)) of this kind comprises a pump body 100 having a cylinder 101 and a plunger 102, a manual lever (not shown) which allows the plunger 102 to reciprocate in the cylinder 101, a filter (reverse osmosis membrane) 130, a suction passage 103 which sucks liquid (seawater or dirty water) from outside into a pumping chamber 100a of the pump body 100, a sending-out passage 104 for sending out the liquid in the pumping chamber 100a to the filter, a supply passage 131 for flowing, to outside, the water which was purified through the filter 130, a circulation passage 105 for circulating condensed water which did not pass through the filter 130, into a driving chamber 100b of the pump body 100, a discharge passage 106 for discharging the condensed water outside from the driving chamber 100b, and a switching valve (cross valve) 110 which switches a communication state with respect to the driving chamber 100b toward the circulation passage 105 or the discharge passage 106. This conventional pump apparatus can rock the manual lever with a slight force utilizing a liquid pressure of the condensed water generated at the time of pumping operation. In FIGS. 8 and 9, dotted arrows show a direction of flow of fluid, and arrows A and B show reciprocating direction of the plunger 102.

The switching valve 110 includes a cylindrical hole 111 formed in a manifold (not shown) which covers an outside of the pump body 100, a shuttle 112 accommodated in the cylindrical hole 111 and provided at its outer peripheral surface with a pair of first recessed peripheral groove 112a and second recessed peripheral groove 112b, a plug 113 which liquid-tightly seals an end opening of the cylindrical hole 111, a rod shaft 114 which penetrates the plug 113 and which is connected to one end of the shuttle 112, and a button 115 mounted on one end of the rod shaft 114. Formed between the pump body 100 and the manifold are a first flow-in passage 116 for allowing a portion of liquid in the pumping chamber 100a to flow into a first chamber 111a formed on a deep side within the cylindrical hole 111, a second flow-in passage 117 for allowing a portion of condensed water in the driving chamber 100b into a second chamber 111b formed on the side of the rod shaft 114 in the cylindrical hole 111, and a communication passage 118 which switches a communication state between the circulation passage 105 and the discharge passage 106 through one of the pair of recessed peripheral grooves 112a and 112b by means of the reciprocation operation of the shuttle 112. A flow-out hole 105a of the circulation passage 105 is in communication with the first recessed peripheral groove 112a of the shuttle 112, and the discharge passage 106 is in communication with the second recessed peripheral groove 112b. A reference numeral 121 represents an intake valve, a reference numeral 122 represents a discharge valve, and a reference numeral 123 represents a relief valve.

A basic operation when liquid is sent out by this conventional pump apparatus (JP-B 3-21208 (1991)) will be briefly explained. The manual lever is rocked to move the plunger 102 of the pump body 100 up (in the direction of the arrow B) from a state shown in FIG. 8 to a state shown in FIG. 9 toward one end of the pump body 100. With this operation, liquid flows into the pumping chamber 100a through the suction passage 103 from outside. On the other hand, if the plunger 102 is moved down (in the direction of the arrow A) from the state shown in FIG. 9 to the state shown in FIG. 8, the liquid is sent to the filter 130 through the sending-out passage 104 from the pumping chamber 100a, and a portion of the liquid which passed through the filter 130 flows out as purified drinking water through the supply passage 131. At that time, a portion of the liquid in the pumping chamber 100a flows into a second chamber 111a of the switching valve 110 through the first flow-in passage 116, pushes and moves the shuttle 112, switches the first recessed peripheral groove 112a and the communication passage 118 into the communication state, and condensed water which is remaining liquid and which did not pass through the filter 130 passes through the circulation passage 105, the first recessed peripheral groove 112a of the switching valve 110 and the communication passage 118 and is circulated into the driving chamber 100b. A liquid pressure of this circulated condensed water cooperates with a force applied to the manual lever to move the plunger 102 down. That is, since a pressure existing in the pump system is balanced, the pumping operation can be carried out only by adding a slight force to the manual lever. Thereafter, if the plunger is again moved up (in the direction of the arrow B), the condensed water in the driving chamber 100b flows into the second chamber 111b of the switching valve 110 through the second flow-in passage 117, the shuttle 112 is moved by the liquid pressure, the second flow-in passage 117 and the discharge passage 106 are switched to the communication state through the second recessed peripheral groove 112b, and the condensed water in the driving chamber 100b is discharged out.

In the case of this pump apparatus, however, when the pumping operation is started, air in the driving chamber 100b is discharged and liquid is smoothly sucked into the pumping chamber 100a. Therefore, it is necessary to carry out the following operation. That is, the button 115 is pressed by a finger (at a pressure of about 1.06 kg/cm$^2$ (15 psi), the shuttle 112 is forcibly moved to the deep end of the cylindrical hole 111 to close the flow-out hole 105a of the circulation passage 105 and to open the discharge passage 106 (see FIG. 9), and air in the driving chamber 100b must be discharged into the discharge passage 106 through the communication passage 118 and the second recessed peripheral groove 112b of the switching valve 110. This button-pressing operation is an adjusting operation required until the pump apparatus functions normally, and it is necessary to continue this operation until the liquid flows out from the discharge passage 106 and air in the pump system is discharged in some degrees (until a pressure of about 5.62 kg/cm$^2$ (80 psi) is generated). That is, if the pump system is filled with liquid, the shuttle 112 reciprocates (switching of the switching valve 110 normally functions) in the cylindrical hole 111 with appropriate timing by a liquid pressure generated by the reciprocating movement of the plunger 102, and condensed water normally flows into the driving chamber 100b and is normally discharged from the driving chamber 100b. However, in an initial state of the pumping operation, since air exists in the pump system, the internal pressure (liquid pressure) in the driving chamber 100b is insufficient and a frictional resistance in a dry state is caused between the shuttle 112 and the cylindrical hole 111. For this reason, the shuttle 112 can not easily move to the deep side in the cylindrical hole 111, and since the switching valve 110 can not switch with appropriate timing, air can not be discharged. There is a structural cause that since a passage for flowing fluid into the driving chamber 100b and for discharging fluid from the driving chamber 100b is the single communication passage 118, the fluid reversely flows through the communication passage 118 immediately after the flow-in and flow-out are switched by the switching valve 110, and the fluid can not flow easily.

SUMMARY OF THE INVENTION

The present invention solves the above problem by providing a pump apparatus which can normally function in the initial pumping operation without any adjustments being made, and which has a simplified structure for easier production thereof.

The present invention provides a pump apparatus which provides a pump body including a cylinder, a piston reciprocably moving in the cylinder, and a piston rod having two ends, one end connected to the piston and the other end projecting outward from the cylinder, in which the piston moves up to suck fluid from outside of the cylinder into a pumping chamber in the cylinder through a suction passage and discharge fluid in a pumping driving chamber in the cylinder to outside of the cylinder through an external discharge passage, while the piston moves down to send the fluid in the pumping chamber to an external fluid-sending destination through a sending-out passage and circulate a portion of the fluid sent to the fluid-sending destination into the pumping driving chamber through a circulation passage, the pump apparatus comprising: a switching valve provided in the circulation passage; and a link mechanism for driving the switching valve and the piston rod, wherein the switching valve includes a sub-cylinder located in parallel to the cylinder of the pump body, and a plunger reciprocably moving in the sub-cylinder to bring the external discharge passage into and out of communication with the pumping driving chamber, and the link mechanism includes a connecting rod projecting outward from the sub-cylinder, and a connecting bar for connecting the piston rod and the connecting rod with each other through a first pivot and a second pivot to apply a pressure to the piston rod and the connecting rod to be reciprocated.

According to the present invention, the pump apparatus can obtain a high pressure with a low driving pressure. The pump apparatus includes a passage for allowing the inflow and outflow of the circulating fluid with respect to the pumping driving chamber of the pump body, and a switching valve for switching between opening and closing of the passage. The plunger of the switching valve reciprocates in association with reciprocating operation of the piston rod by the link mechanism. Therefore, following effects can be obtained:

(a) According to the present invention, since the mechanical link mechanism is used for operating the plunger which switches the passage, even in the pumping initial state, especially in a state in which air exists in the pumping driving chamber and a liquid pressure is insufficient, the plunger instantaneously reacts and reciprocates with appropriate timing, and the pumping operation can normally and smoothly be started without adjusting the operation unlike the conventional method (JP-B 3-21208 (1991)).

(b) Due to the link mechanism which operates the plunger, a pressure pipe for operating the plunger is unnecessary unlike the conventional method, a structure of the pump apparatus is simplified and the pump apparatus can be reduced in size. The number of sealing portions of the pressure pipe can be reduced.

(c) In the conventional method, in order to increase the operating force of the plunger, a pressure receiving area when the plunger is operated must be increased, and this hinders the miniaturization. Whereas, since the present invention uses the mechanical link mechanism for moving the plunger, a force for moving a connecting bar can be utilized for the operating force of the plunger, and the plunger can be reduced in size.

(d) In the present invention, a pressure difference is not used for switching the passage, and the passage is switched by the link mechanism. Therefore, the passage can be switched reliably when the connecting bar starts moving upward and downward, and the connecting bar can be operated smoothly. Further, the operation timing of the plunger can freely be changed by adjusting the link mechanism.

(e) In the present invention, since the plunger is connected to the link mechanism, even if the plunger is fixed by salt or the like, the connecting bar can be operated as usual, the plunger can return to its operating state, and disassembling operation or special operation is not required for returning the plunger to its operating state. This is especially effective when the compression liquid is prone to fix the operating part due to salt, sugar or other component.

(f) In the present invention, since the plunger is operated in association with operation of the connecting bar, the plunger is not operated if the connecting bar is not operated. Therefore, when medium or the like for a membrane of a fluid sending destination connected to the pump apparatus is charged, if the connecting bar is fixed by means of a belt or the like so that the connecting bar does not move, the plunger is also fixed simultaneously, and it is possible to avoid an accident that the plunger is operated by vibration, impact or other external factor and the medium leaks.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIGS. 1A and 1B are front sectional views showing an embodiment of a pump apparatus of the present invention, wherein FIG. 1A shows a state before fluid is sucked and FIG. 1B shows a first fluid sucking state;

FIGS. 2C and 2D show continuation of FIGS. 1A and 1B, wherein FIG. 2C shows a second fluid sucking state and FIG. 2D shows a third fluid sucking state;

FIGS. 4A and 4B are front sectional views showing an embodiment of a pump apparatus of the present invention, wherein FIG. 4A shows a state before fluid is discharged and FIG. 4B shows a first fluid discharging state;

FIGS. 5C and 5D show continuation of FIGS. 4A and 4B, wherein FIG. 5C shows a second fluid discharging state and FIG. 5D shows a third fluid discharging state;

FIGS. 7A and 7B show a plunger, wherein FIG. 7A is a plan view of the plunger and FIG. 7B is a front view of the plunger;

DESCRIPTION OF THE PREFERRED EMBODIMENTS

A pump apparatus of the present invention provides a pump body including a cylinder, a piston reciprocably moving in the cylinder, and a piston rod having two ends, one end connected to the piston and the other end projecting outward from the cylinder, in which the piston moves up to suck fluid from outside of the cylinder into a pumping chamber in the cylinder through a suction passage and discharge fluid in a pumping driving chamber in the cylinder to outside of the cylinder through an external discharge passage, while the piston moves down to send the fluid in the pumping chamber to an external fluid-sending destination through a sending-out passage and circulate a portion of the fluid sent to the fluid-sending destination into the pumping driving chamber through a circulation passage, the pump apparatus comprising: a switching valve provided in the circulation passage; and a link mechanism for driving the switching valve and the piston rod, wherein the switching valve includes a sub-cylinder located in parallel to the cylinder of the pump body, and a plunger reciprocably moving in the sub-cylinder to bring the external discharge passage into and out of communication with the pumping driving chamber, and the link mechanism includes a connecting rod projecting outward from the sub-cylinder, and a connecting bar for connecting the piston rod and the connecting rod with each other through a first pivot and a second pivot to apply a pressure to the piston rod and the connecting rod to be reciprocated.

A concrete structure of the link mechanism will be explained. When the piston is located at a dead center on its proximal end side, the plunger is located at a dead center on its distal end side, and when the piston is located at a dead center on its distal end side, the plunger is located at a dead center on its proximal end side. The piston has a stroke amount larger than that of the plunger.

With this structure, the piston and the plunger can carry out the following basic operations (1) and (2):

(1) If the connecting bar is rocked in the fluid suction direction, the first pivot acts as a fulcrum and the second pivot functions as a pressure cone apex, and the plunger first moves to the other end side dead center. Then, the second pivot acts as a fulcrum and the first pivot acts as a pressure cone apex, the piston moves to the one end side dead center and fluid is sucked into the pumping chamber. On the other hand, fluid in the pumping driving chamber is discharged out from the external discharge passage through the switching valve.

(2) If the connecting bar is rocked in the fluid discharging direction, the first pivot acts as a fulcrum and the second pivot functions as a pressure cone apex, and the plunger first moves to one end side dead center. Then, the second pivot acts as a fulcrum and the first pivot acts as a pressure cone apex, the piston moves to the other end side dead center and fluid in the pumping chamber is sent to the fluid-sending destination through the sending-out passage. A portion of the fluid is discharged outside from the fluid-sending destination, and remaining high pressure fluid is sent to the pumping driving chamber from the fluid-sending destination through the circulation passage and the switching valve.

As a concrete structure of the switching valve, the following structures (A) and (B) may be employed:

(A) The sub-cylinder is provided at its inner peripheral surface with a plurality of annular seals, more concretely, four O-rings disposed at predetermined intervals in its axial direction. The plunger is provided at its outer peripheral surface with at least one recess, more concretely, a plurality of hemispherical recesses at an intermediate position in the axial direction. When the plunger moves to either dead center, the recess forms a gap between one of the O-rings, and the pumping driving chamber is brought into communication with the external discharge passage or the circulation passage.

(B) The sub-cylinder is provided at its inner peripheral surface with at least two recesses, more concretely, a plurality of hemispherical recesses disposed at predetermined intervals in its axial direction. The plunger is provided at its outer peripheral surface with a plurality of annular seals, more concretely, four O-rings disposed at predetermined intervals in the axial direction. When the plunger moves to either dead center, each recess forms a gap between one of the O-rings, and the pumping driving chamber is brought into communication with the external discharge passage or the circulation passage.

The above-mentioned structure (A) is more advantageous than the structure (B). With the structure (A), the O-ring can be prevented from being worn and damaged. The shape of the cross section of the O-ring is not particularly limited, and may be circular, elliptic, square, rectangular, U-shaped and the like. The recess is not limited to the spherical shape, and a recessed peripheral groove having a semicircular, semi-elliptic, triangular, square, or rectangular cross section may be used.

What is important here is that when the positions of the annular seal and the recess are aligned, a gap through which fluid passes is formed.

However, in order to avoid a case that the O-ring is deformed by high pressure applied to the plunger, the O-ring is caught by the recess and the plunger can not operate smoothly, it is preferable that the plunger is not provided at its entire outer peripheral surface with the grooves, and a necessary passage area is secured and the minimum number of recesses are provided. For example, it is preferable that the O-ring is circular in shape at cross section having a diameter of 1.5 to 3.5 mm, and the recess has a hemispherical shape having a curvature radius of 1.5 to 4 mm. Preferably, one to six recesses are provided in the circumferential direction. The stroke amount of the plunger may be set to 3 to 10 mm, and the stroke amount of the piston may be set to 10 to 30 mm. However, in view of practical and natural operation, it is appropriate to set the plunger stroke amount to 5 to 7 mm and the piston stroke amount to 15 to 25 mm.

In the structure (A), the circulation passage connected to the fluid-sending destination may be connected to a portion of the sub-cylinder between two of the annular seals on its proximal end side, the circulation passage connected to the pumping driving chamber may be connected to a portion of the sub-cylinder between two of the annular seals in the middle, and the external discharge passage may be connected to a portion of the sub-cylinder between two of the annular seals on its distal end side.

In the present invention, the connecting bar may be a manual connecting bar. This structure is convenient because the pump apparatus can be carried in a place where the electric power can not be obtained, i.e., in a boat or in the field, and the pump apparatus can be used manually. The pump apparatus may not be of a manual-type pump apparatus, and a driving device such as a small motor and a small engine may be utilized, and a mechanism capable of converting the rotation force of such a device into a reciprocating force may be mounted on the connecting bar.

In the present invention, the pump apparatus may be connected to a filter portion via the sending-out passage. The filter portion may include a semipermeable membrane for filtering the fluid, an unpurified-fluid containing section for containing the fluid sent from the pumping chamber and impurities remained after filtering the fluid, and a purified-fluid containing section for containing the fluid filtered through the membrane. The unpurified-fluid containing section may be connected to the circulation passage and the purified-fluid containing section may be connected to the discharge passage.

In this invention, the term "fluid" may be defined as fluid including liquid such as seawater, running water, dirty water and oil, as well as gas such as air and nitrogen.

Hereinafter, an embodiment of the pump apparatus of this invention will be explained based on the drawings. The invention is not limited to the embodiment.

The pump apparatus of this invention includes a pump body 1. The pump body 1 includes a cylinder 2, a piston 3 provided in the cylinder 2 such that the piston 3 can reciprocate, and a piston rod 4 connected to the piston 3 and penetrating an upper wall of the cylinder 2 and projecting outside. The pump apparatus further includes a reverse osmosis membrane 20 which is a fluid-sending destination into which fluid is sent from the pump body 1, a switching valve 30 which brings the reverse osmosis membrane 20 and a pumping driving chamber 2a of the cylinder 2 into communication with each other and cuts off the communication, and a link mechanism 40 connected to the piston rod 4 and to a plunger 32 (which will be described later) of the switching valve 30.

This pump apparatus sends liquid such as seawater or non-purified water into the reverse osmosis membrane 20 as a filter portion through a sending-out passage 11. A portion of the liquid is passed to a purified-fluid containing section through the reverse osmosis membrane 20, thereby providing purified drinking water. The remaining portion of the liquid (condensed water including impurities) which can not pass through the reverse osmosis membrane 20 is allowed to circulate through the circulation passage 12 from a unpurified-fluid containing section so that its liquid pressure can be utilized for pumping operation.

A side of the pump body 1 closer to the piston rod 4 in the cylinder 2 is the pumping driving chamber 2a, and the other side of the pump body 1 is a pumping chamber 2b. A notch is formed in a corner portion of the piston 3 in its circumferential direction so that when the piston 3 abuts against the upper wall of the cylinder 2, the pumping driving chamber 2a slightly remains. The piston 3 is provided with an O-ring to keep the hermeticity between the pumping driving chamber 2a and the pumping chamber 2b. The piston 3 is also provided at its appropriate location with seal members for keeping the hermeticity in the pump apparatus. In the pump body 1, the inner diameter of the cylinder 2 is 30 mm, and the stroke amount of the piston 3 in the cylinder 2 is 17 mm.

The pump body 1 includes a suction passage 13 for taking fluid from outside into a pumping chamber 2b, the sending-out passage 11 for sending liquid under high pressure from the pumping chamber 2b toward the reverse osmosis membrane 20 at the time of pumping operation, the circulation passage 12 for circulating, into the pumping driving chamber 2a, a portion of the liquid which is sent to the reverse osmosis membrane 20 under high pressure, a discharge passage 14 for discharging, to outside, liquid which passed through the reverse osmosis membrane 20, and an accommodation chamber for accommodating the cylindrical reverse osmosis membrane 20. An outer peripheral space of the accommodation chamber in which the reverse osmosis membrane 20 is accommodated constitutes a portion of the circulation passage 12. An intake valve (check valve) 13a is provided on the side of the suction passage 13 closer to the pumping chamber 2b, and a sending valve (check valve) 11a is provided on the side of the sending-out passage 11 closer to the pumping chamber 2b.

The switching valve 30 includes a sub-cylinder 31 which is integrally formed on a side of the cylinder 2 of the pump body 1 and which is in parallel to the cylinder 2, a plunger 32 provided in the sub-cylinder 31 such that the plunger 32 can reciprocate therein, and an external discharge passage 33 which is brought into communication and out of communication with the pumping driving chamber 2a by the reciprocating movement of the plunger 32.

Figure 7A:
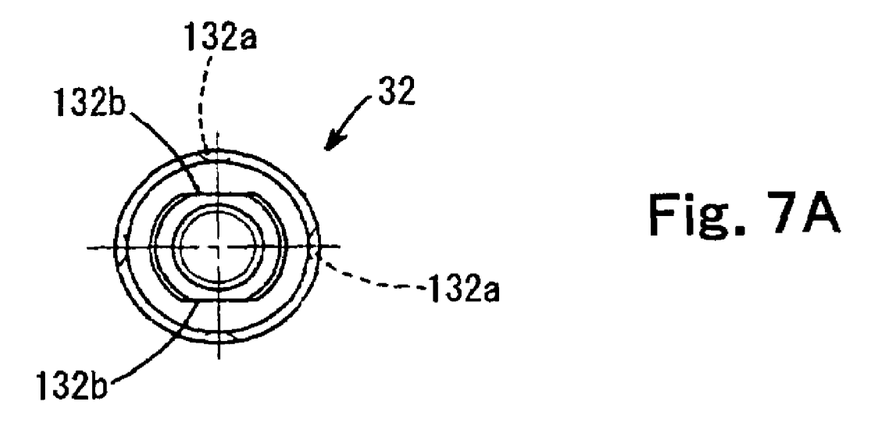
Figure 7B:
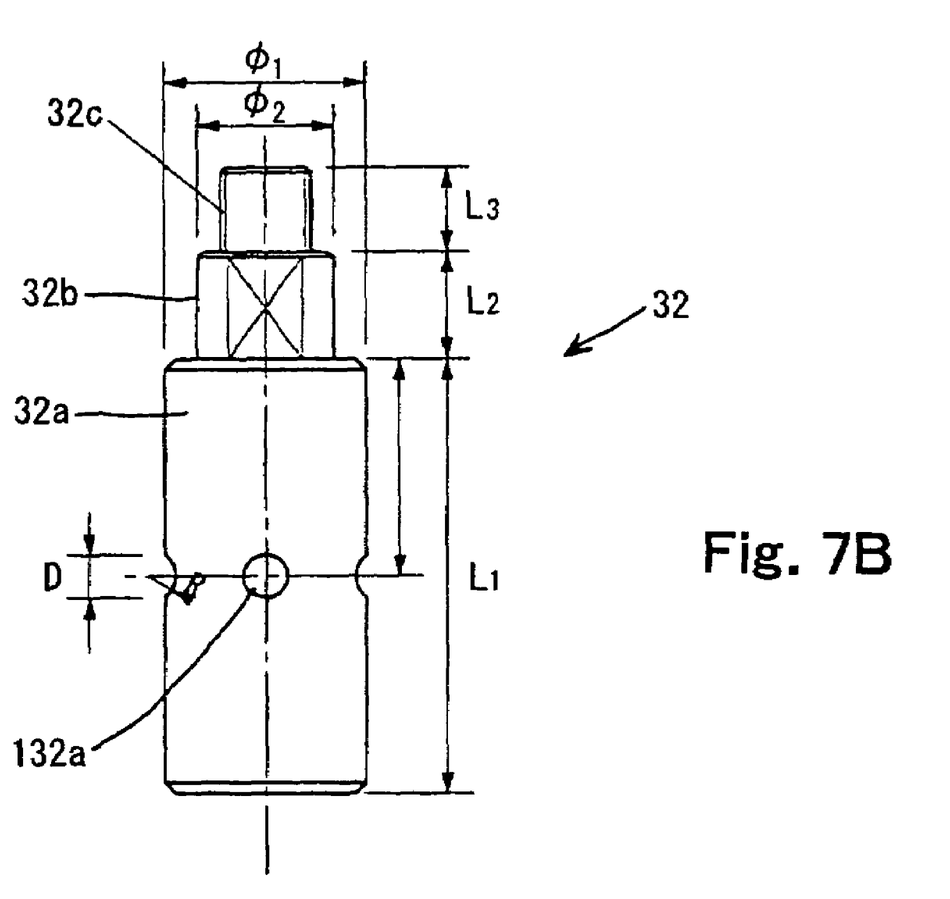

As shown in FIG. 7, the plunger 32 includes a substantially cylindrical body 32a, a medium diameter portion 32b which is continuously provided on an upper end surface of the body 32a, and a small diameter portion 32c which is continuously provided on an upper end surface of the medium diameter portion 32b. Four hemispherical recesses 132a are formed in the middle of an outer peripheral surface of the body 32a in the axial direction while keeping an angle of 90° from one another. A pair of flat surface portions 132b are formed on an outer peripheral surface of the medium diameter portion 32b at opposed locations through 180°. Sizes of the plunger 32 in this embodiment are as follows:

Diameter $\Phi_1$ of the body 32a: 17.8 mm
Length $L_1$ of the body 32a: 41.0 mm
Diameter D of the hemispherical recess 132a: 4.0 mm
Radius of curvature R of the spherical recess 132a: 2.5 mm
Diameter $\Phi_2$ of the medium diameter portion 32b: 12.0 mm
Length $L_2$ of the medium diameter portion 32b: 10.0 mm
Length $L_3$ of small diameter portion 32c: 8.0 mm The medium diameter portion 32b and the small diameter portion 32c of the plunger 32 constitute a portion of a link mechanism 40 which will be described later. In this embodiment, the body 32a, the medium diameter portion 32b and the small diameter portion 32c constitute the plunger 32 as one part, but the medium diameter portion 32b and the small diameter portion 32c may be formed as separate parts from the body 32a, and they may be connected to each other through screws.

Figure 3:
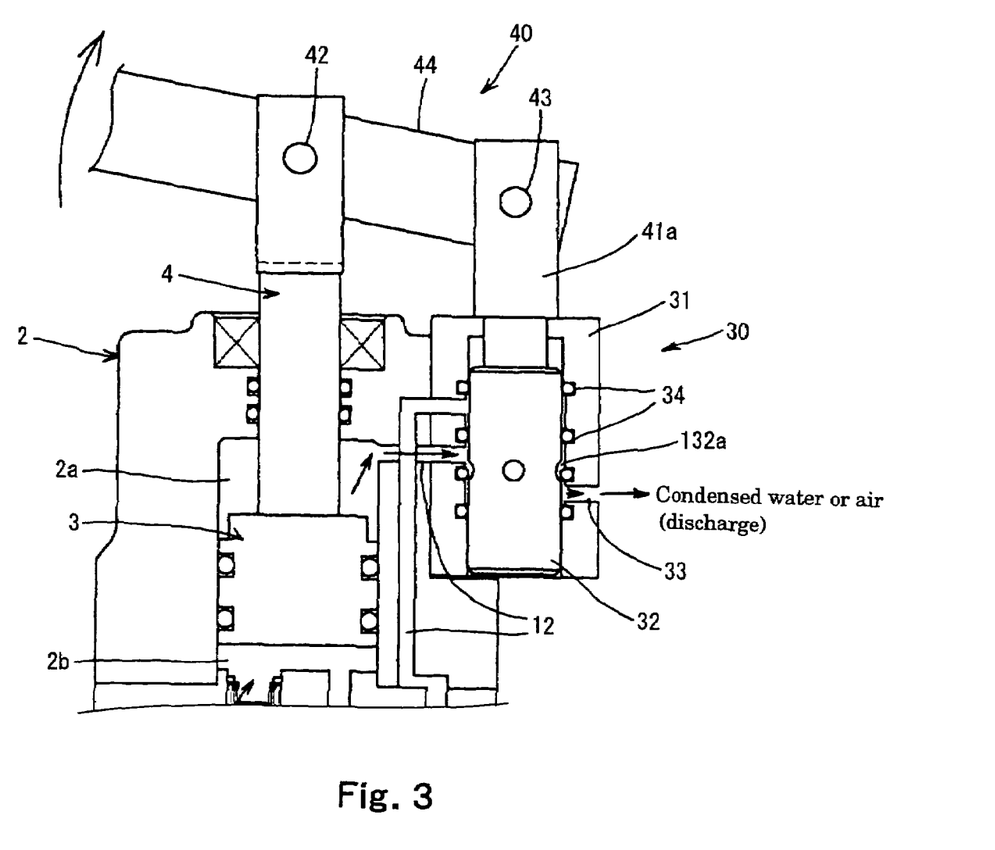
FIG. 3 is an enlarged view of an essential portion of FIG. 2C.

As shown in FIG. 3, in the switching valve 30, four recessed peripheral grooves are formed in an inner peripheral surface of the sub-cylinder 31 in the axial direction, an O-ring 34 is mounted on each recessed peripheral groove. A hole is formed in an upper wall of the sub-cylinder 31 such as to penetrate the small diameter portion 32c and the medium diameter portion 32b of the plunger 32. The O-ring 34 is circular in shape with a cross section having a diameter of 2.4 mm. The length of the chamber of the sub-cylinder 31 in the axial direction is set such that the stroke amount of the plunger 32 becomes 6 mm.

The four recessed peripheral grooves formed in the sub-cylinder 32 are formed at location where an intermediate position between the inner two recessed peripheral grooves and an intermediate position of an inner peripheral surface of the sub-cylinder 31 in the axial direction match each other, and at location where the inner two recessed peripheral grooves are superposed on the recess 132a when the plunger 32 is located at its proximal or distal dead center. The circulation passage 12 connected to the reverse osmosis membrane 20 is connected to a portion of the sub-cylinder 32 between two of the O-rings 34 on its proximal end side, the circulation passage 12 connected to the pumping driving chamber 2a is connected to a portion of the sub-cylinder 32 between two of the O-rings 34 in the middle, and the external discharge passage 33 is connected to a portion of the sub-cylinder 32 between two of the O-rings 34 on its distal end side.

The link mechanism 40 includes a connecting rod 41 which projects outward from an upper end of the sub-cylinder 31 of the switching valve 30. The link mechanism 40 also includes a straight handle 44. The handle 44 connects the piston rod 4 and the connecting rod 41 with each other through a first pivot 42 and the second pivot 43. The handle 44 applies a force to the piston rod 4 and the connecting rod 41 to allow them to reciprocate. The connecting rod 41 includes a mounting member 41a (see FIG. 3) mounted on the handle 44 through the second pivot 43. The connecting rod 41 also includes the medium diameter portion 32b and the small diameter portion 32c of the plunger 32 connected to the mounting member 41a.

The link mechanism 40 will further be explained. In a state in which when the piston 3 is located at the distal dead center, the plunger 32 is located at the proximal dead center (state shown in FIG. 1A), or in a state in which when the piston 3 is located at the proximal dead center, the plunger 32 is located at the distal dead center (state shown in FIG. 2D), the handle (connecting bar) 44 connects the piston rod 4 and the connecting rod 41 with each other through the first pivot 42 and the second pivot 43. A stroke amount of the piston 3 is set longer than that of the plunger 32. The lengths of the rods 4 and 41 are set such that an end of the connecting rod 41 is located above an end of the piston rod 4 in the state shown in FIG. 1A, and the end of the connecting rod 41 is located below the end of the piston rod 4 in the state shown in FIG. 2D.

Next, the operation, effect of the pump apparatus of the present invention will be explained with reference to FIGS. 1 to 6. In the explanation, liquid such as seawater and dirty water is used as the fluid.

Suction Operation

Figure 1A:
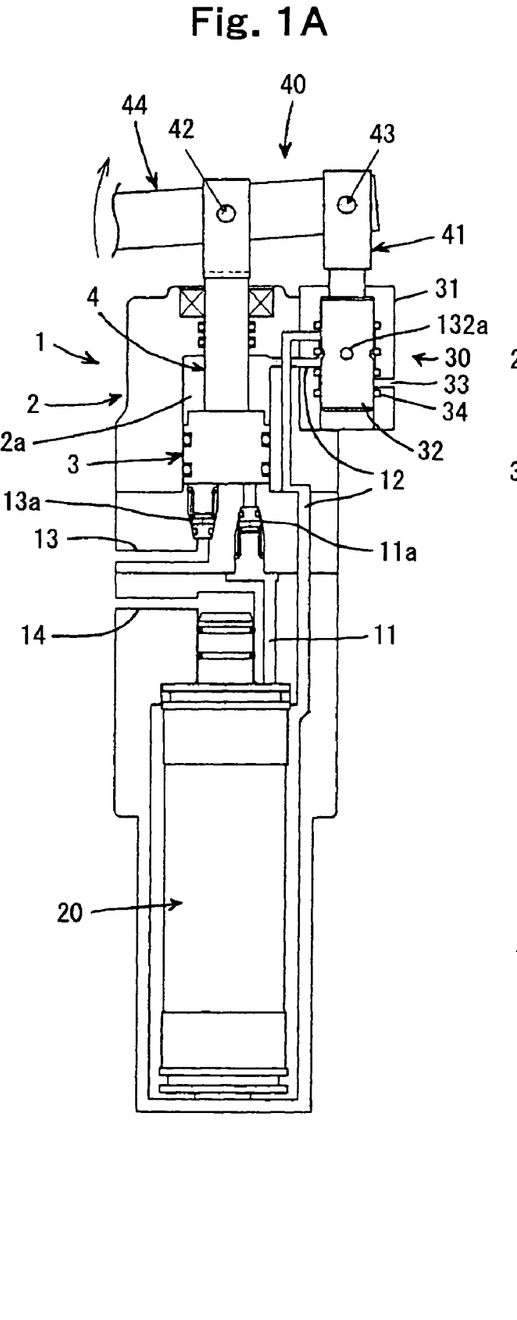

First, as shown in FIG. 1A, in the initial state of pumping, the piston 3 is located at the distal dead center (the other end side dead center), and the plunger 32 is located at the proximal dead center (one end side dead center). At that time, since the recess 132a of the plunger 32 is located at the position of the second O-ring 34 from the top (see FIG. 6), a gap is formed between the recess 132a and the O-ring 34 through which fluid flows. With this structure, the reverse osmosis membrane 20 and the pumping driving chamber 2a are in communication with each other, but the external discharge passage 33 is closed.

Figure 1B:
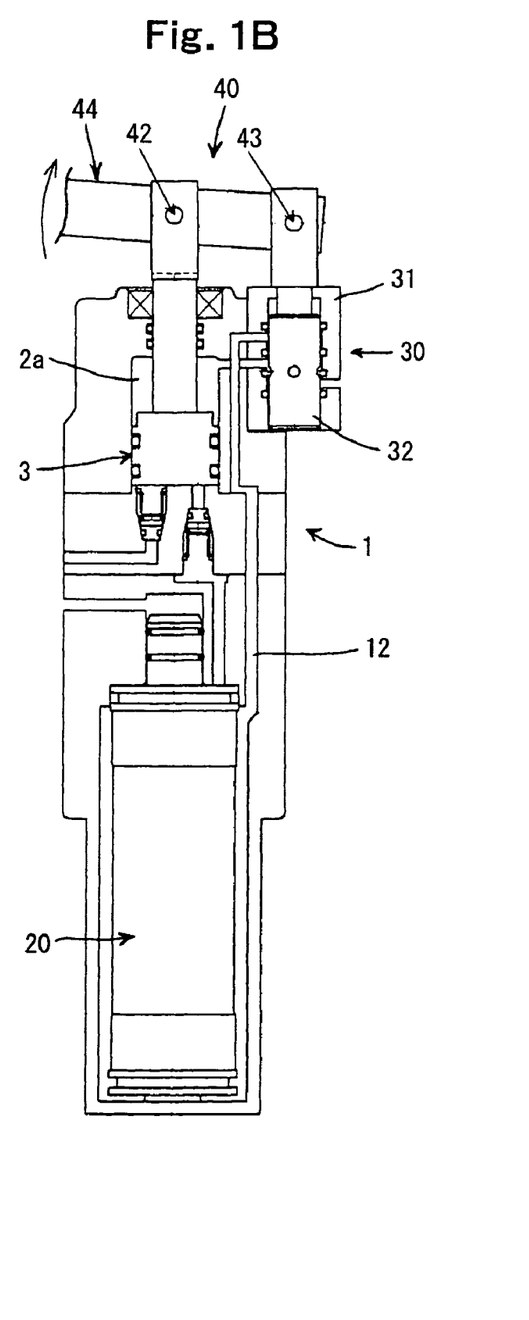

From this state, if the handle 44 of the link mechanism 40 is rocked upward, the first pivot 42 functions as a fulcrum, the second pivot 43 functions as a pressure cone apex, the pushing force from the handle 44 is mechanically transmitted to the plunger 32, and the plunger 32 is moved to the distal dead center as shown in FIG. 1B. At that time, since the mounting member 41a abuts against the sub-cylinder 31, the movement of the plunger 32 is limited. This movement of the plunger 32 to the distal dead center allows the recess 132a to be located at a position of the third O-ring 34 from the top (see FIG. 3), whereby a gap through which the fluid passes is formed between the O-ring 34 and the recess 132a. Further, the external discharge passage 33 is opened due to this gap, and the discharge passage 33 and the pumping driving chamber 2a are in communication with each other, but the circulation passage 12 is closed.

Figure 2C:
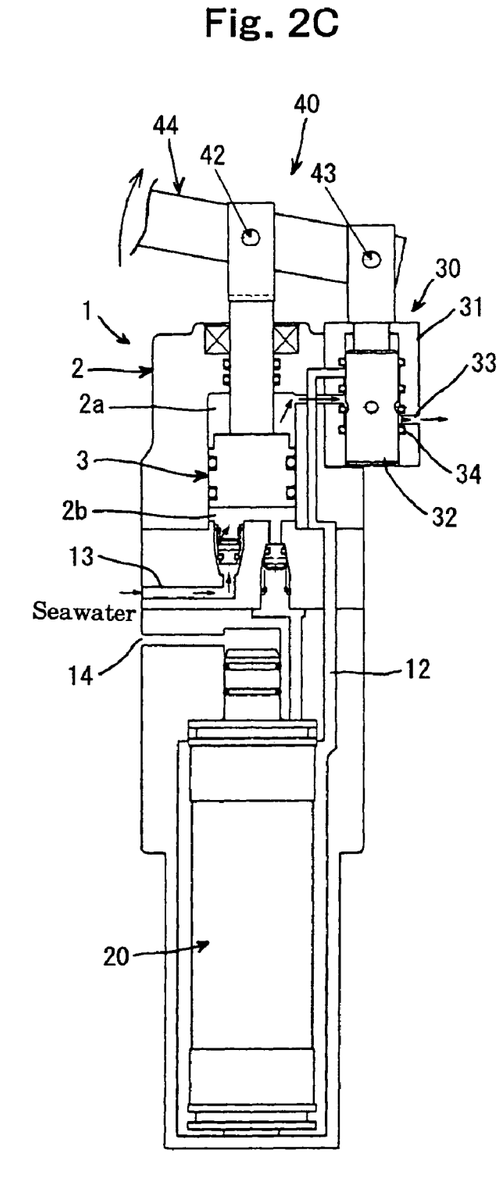

Thereafter, if the handle 44 is further rocked upward, the first pivot 42 functions as a pressure cone apex, the second pivot 43 functions as a fulcrum, and the piston 3 is pulled upward as shown in FIGS. 2C and 3. With this, the air in the pumping driving chamber 2a is compressed; thus, the air is discharged out from the external discharge passage 33 through the gap between the second and fourth O-rings 34 from the top in the switching valve 30. Since the volume of the pumping chamber 2b is increased, a negative pressure is produced, seawater flows from the outside into the pumping chamber 2b through the suction passage 13.

Figure 2D:
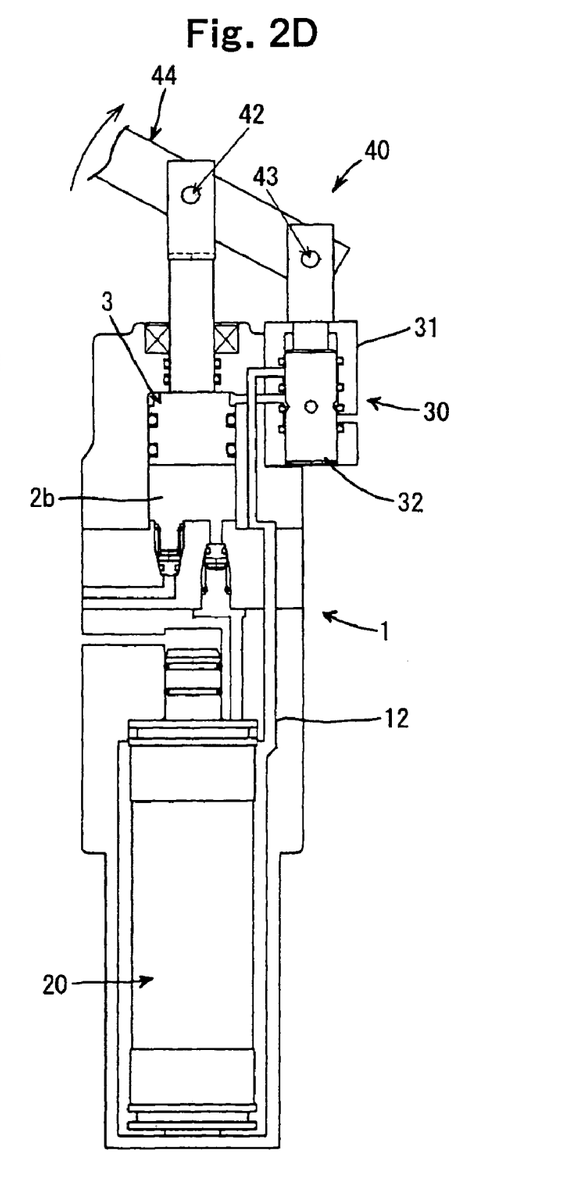

If the handle 44 is further rocked upward, the piston 3 moves to the proximal dead center as shown in FIG. 2D and the rocking movement of the handle 44 is limited, and the inflow of the seawater into the pumping chamber 2b is stopped. This state is shown also in FIG. 4A.

Discharging Operation

Figures 4A, 4B:
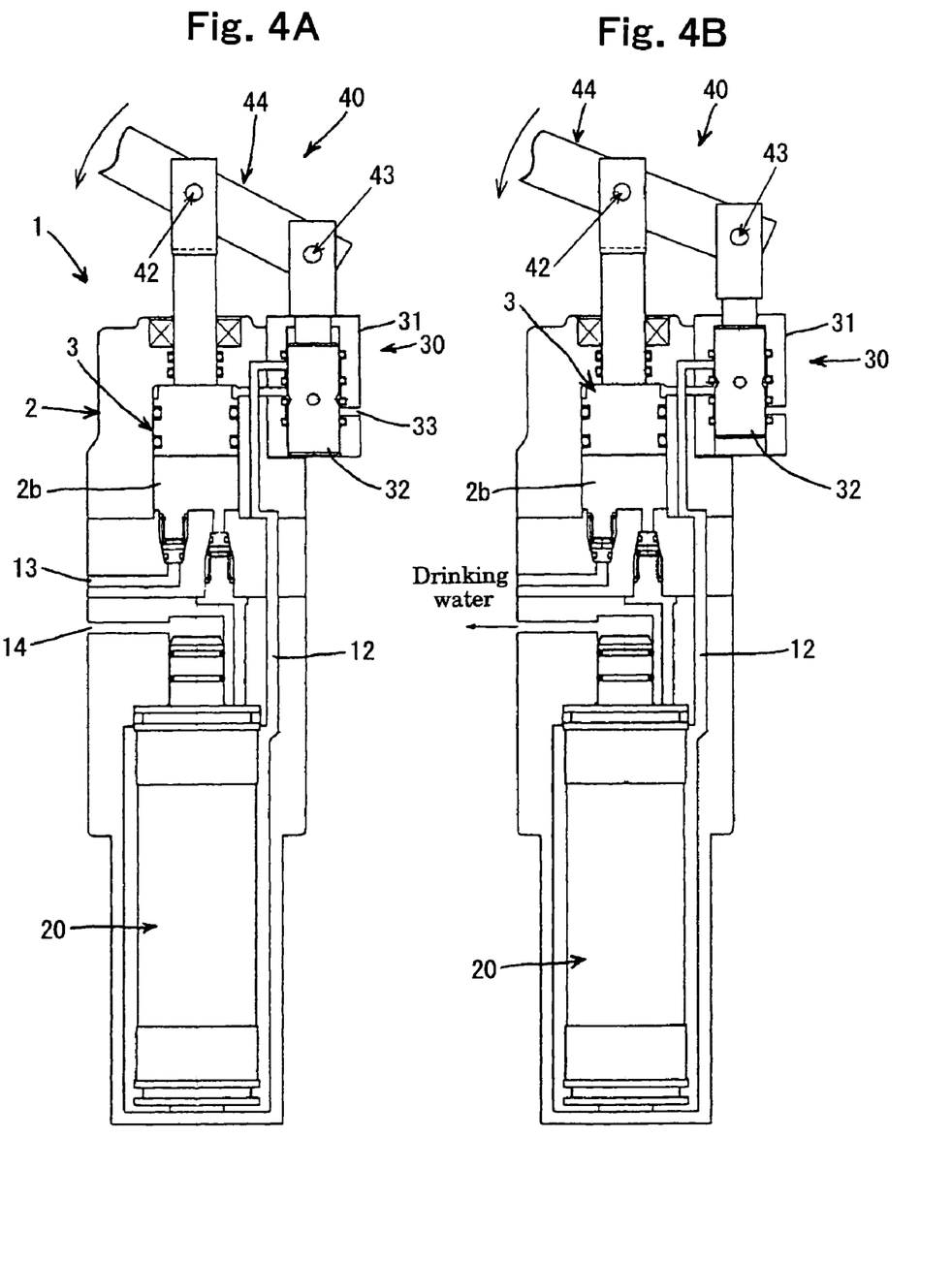

Next, if the handle 44 in the state shown in FIGS. 2D and 4A is lowered, the first pivot 42 functions as a fulcrum and the second pivot 43 functions as a pressure cone apex as shown in FIG. 4B, the pulling-up force from the handle 44 is mechanically transmitted to the plunger 32, and the plunger 32 moves to the proximal dead center. At that time, since the body 32a of the plunger 32 abuts against the inner end surface of the sub-cylinder 31, the movement of the plunger 32 is limited. This movement of the plunger 32 to the proximal dead center allows the recess 132a to move to a position of the second O-ring 34 from the top (see FIG. 6), whereby a gap through which fluid flows is formed between this O-ring 34 and the recess 132a. Further, the circulation passage 12 is opened due to this gap, and the reverse osmosis membrane 20 and the pumping driving chamber 2a are in communication with each other, but the external discharge passage 33 is closed.

Figure 5C:
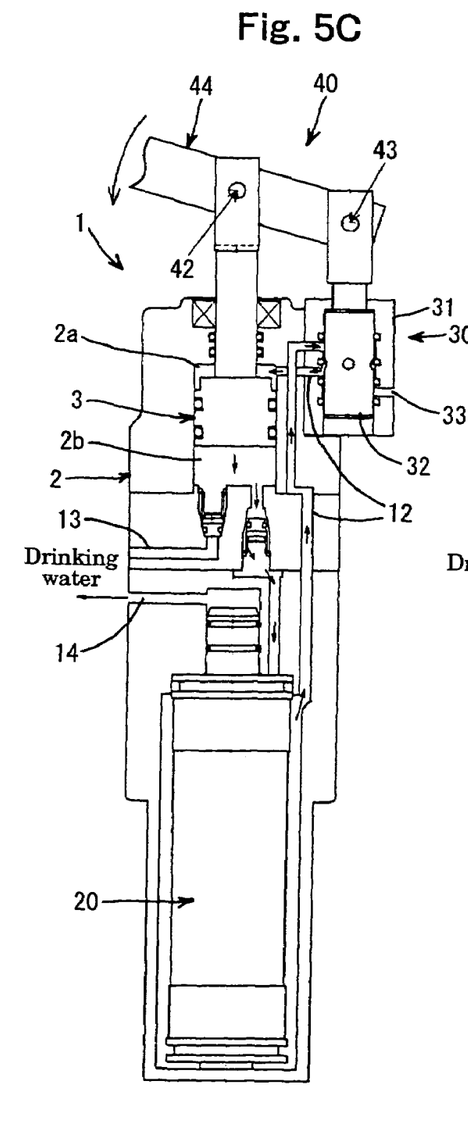
Figure 6:
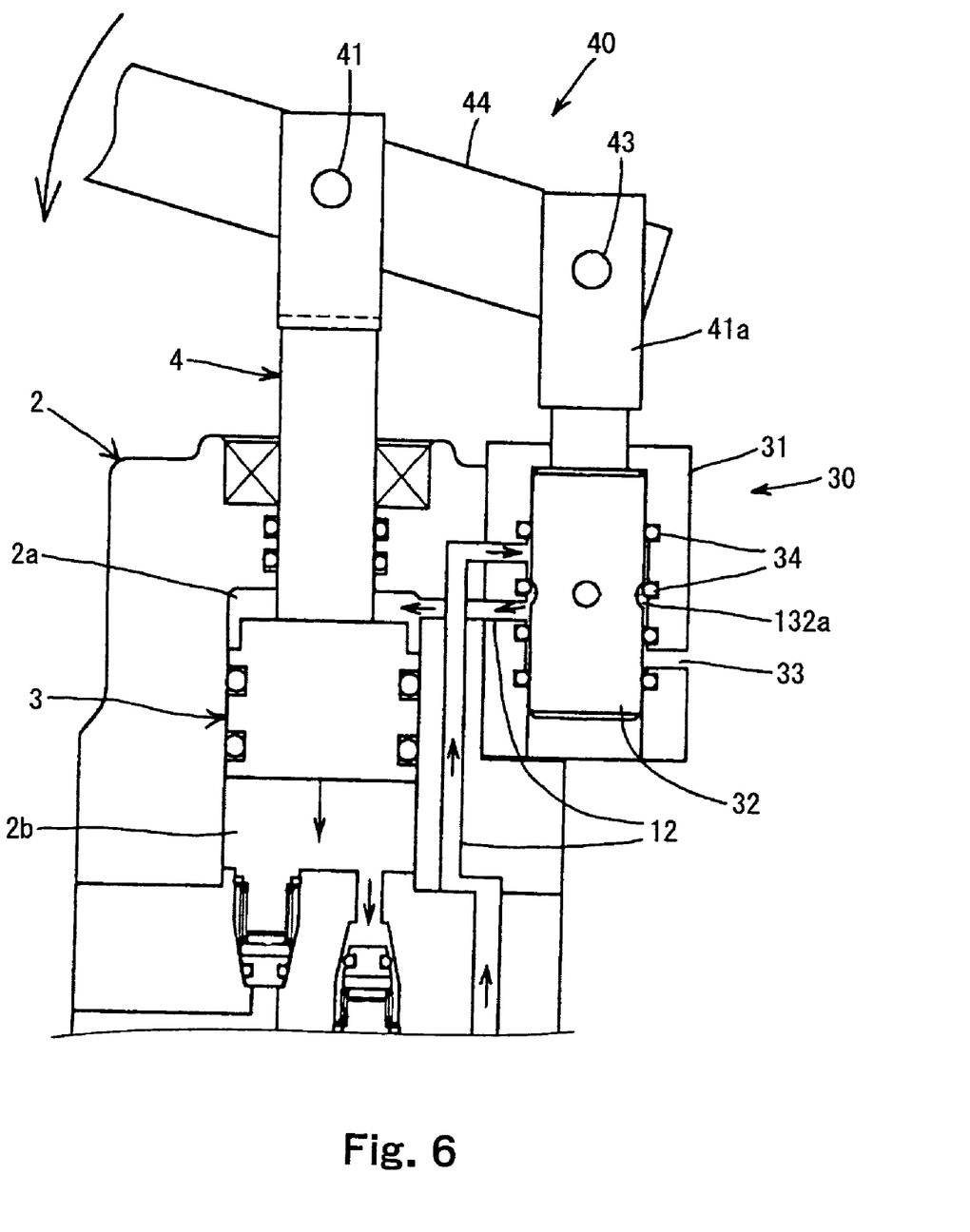
FIG. 6 is an enlarged view of an essential portion of FIG. 5C.

Thereafter, if the handle 44 is further rocked downward, the first pivot 42 functions as the pressure cone apex and the second pivot 43 functions as the fulcrum, and the piston 3 is pushed down as shown in FIGS. 5C and 6. With this, seawater in the pumping chamber 2b is compressed; thus, the high pressure seawater is sent to the reverse osmosis membrane 20 through the sending-out passage 11, and drinking water which passed through the reverse osmosis membrane 20 is discharged out through the discharge passage 14. On the other hand, high pressure condensed water which does not pass through the reverse osmosis membrane flows into the sub-cylinder 31 of the switching valve 30 through the circulation passage 12, and flows into the pumping driving chamber 2a from the terminal end of the circulation passage 12 through the gap between the first and third O-rings 34 from the top, and a pressure of the condensed water functions to push the piston 3.

Figure 5D:
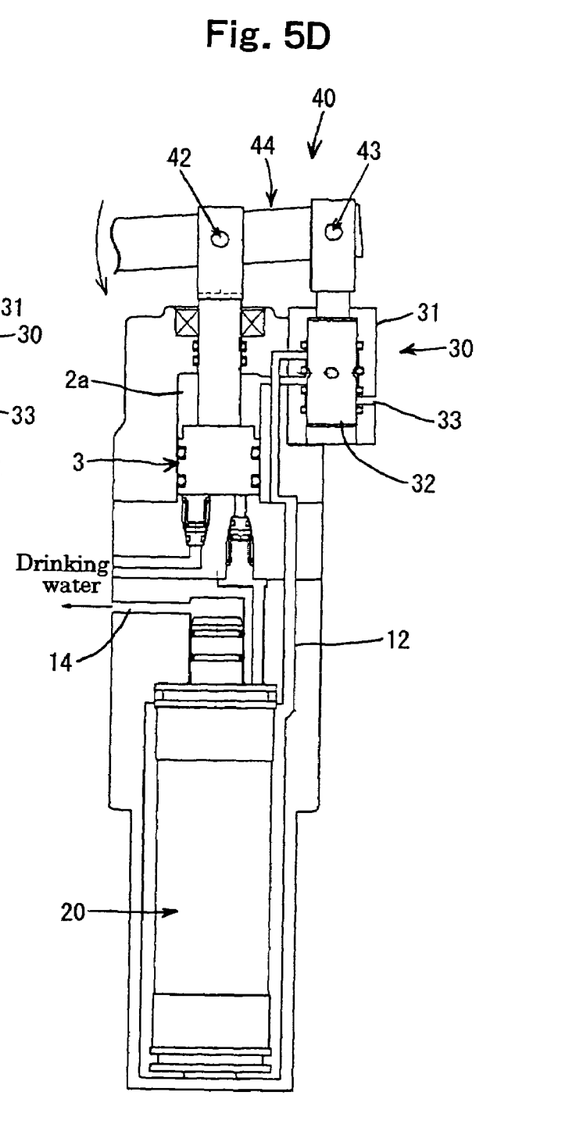

If the handle 44 is further rocked upward, as shown in FIG. 5D, the piston 3 moves to the distal dead center, the rocking movement of the handle 44 is limited, and the inflow of the seawater into the pumping driving chamber 2a is stopped. This state is shown also in FIG. 1A.

Thereafter, if the handle 44 is allowed to reciprocate and rock, condensed water in the pumping driving chamber 2a is discharged from the external discharge passage 33 through the sub-cylinder 31 in the suction operation, and the drinking water is discharged from the discharge passage 14 in the discharging operation.

As described above, according to the pump apparatus of the present invention, even in the initial state of pumping in which air exists in the pump system, the switching valve 30 is switched with appropriate timing by pumping operation caused by only the rocking operation of the handle 44. This allows liquid to be sucked while discharging air in the pump system, making it is possible to start the normal pumping operation.

If almost all air is discharged out from the pump system and the pump system is filled with liquid and a liquid pressure in the pumping chamber 2b and a liquid pressure in the pumping driving chamber 2a are balanced, high pressure (pressure of about 50 kg/cm²) liquid is sent to the reverse osmosis membrane 20 only by rocking the handle 44 with a slight force (force of about 5 kgf), and when the liquid pressure exceeds an osmotic pressure, a portion of the liquid (usually about 10 to 40% of seawater) passes through the reverse osmosis membrane 20 and is purified as drinking water. The drinking water is supplied to outside through the discharge passage 14. Condensed water which did not pass through the reverse osmosis membrane 20 and which includes impurities passes through the switching valve 30 from the circulation passage 12 and circulates into the pumping driving chamber 2a. When the external discharge passage 33 is opened, the condensed water is discharged out.

Although the pump apparatus includes the reverse osmosis membrane in the above embodiment, the reverse osmosis membrane device may be provided outside of the pump apparatus and be connected thereto. A relief valve which prevents abnormal pressure from being applied to the reverse osmosis membrane may be provided in the circulation passage between the switching valve and the reverse osmosis membrane. In the switching valve, the positions of the O-ring and the spherical recess may be reversed. That is, one or more recesses may be provided in the inner peripheral surface of the sub-cylinder so as to sandwich the portion of the sub-cylinder connected to the circulation passage which is in communication with the pumping driving chamber. The four O-rings may be provided on the outer peripheral surface of the plunger at predetermined distances in the axial direction.

The present invention can preferably be used as a pump which sucks fluid and supplies a portion of the fluid to the fluid-sending destination, and which utilizes a pressure of the remaining fluid to obtain high pressure using low driving pressure. When the fluid is seawater, running water or dirty water, examples of the fluid-sending destination to which the fluid is sent from the pump apparatus include a filter portion (filter means) having the semipermeable membrane and a tested pipe for testing pressure resistance. The filter portion has the unpurified-fluid containing section connected to the circulation passage and the purified-fluid containing section connected to the permeated liquid providing destination. In the filter portion, examples of the semipermeable membrane include the reverse osmosis membrane, a precise filter membrane, an ultrafilter membrane, and the like. Especially, the present invention can be preferably used as a pump capable of supplying seawater to obtain high pressure using low driving pressure for obtaining drinking water such as a reverse osmosis membrane device (RO device), a water conversion device, a seawater demineralizer and the like. Examples of the tested pipe as the fluid-sending destination include a running water pipe, a gas pipe, a flexible high pressure hose and the like. The present invention can also be preferably used as a pump capable of supplying high pressure water, high pressure oil or high pressure gas to the tested pipe under low driving pressure.

What is claimed is:

1. A pump apparatus which provides a pump body including a cylinder, a piston reciprocably moving in the cylinder, and a piston rod having two ends, one end connected to the piston and the other end projecting outward from the cylinder, in which the piston moves up to suck fluid from outside of the cylinder into a pumping chamber in the cylinder through a suction passage and discharge fluid in a pumping driving chamber in the cylinder to outside of the cylinder through an external discharge passage, while the piston moves down to send the fluid in the pumping chamber to an external fluid-sending destination through a sending-out passage and circulate a portion of the fluid sent to the fluid-sending destination into the pumping driving chamber through a circulation passage, the pump apparatus comprising:

a switching valve provided in the circulation passage; and a link mechanism for driving the switching valve and the piston rod, wherein the switching valve includes a sub-cylinder located in parallel to the cylinder of the pump body, and a plunger reciprocably moving in the sub-cylinder to bring the external discharge passage into and out of communication with the pumping driving chamber, and the link mechanism includes a connecting rod projecting outward from the sub-cylinder, and a connecting bar for connecting the piston rod and the connecting rod with each other through a first pivot and a second pivot to apply a pressure to the piston rod and the connecting rod to be reciprocated, further wherein the piston and the plunger each have dead centers on distal and proximal end sides thereof, the plunger being located at its distal dead center when the piston is located at its proximal dead center, and the plunger being located at its proximal dead center when the piston is located at its distal dead center, and the piston has a stroke amount larger than that of the plunger, the sub-cylinder has four recessed peripheral grooves formed on an inner peripheral surface thereof at predetermined distances in its axial direction and four annular seals, with each annular seal being mounted on a corresponding one of the four recessed peripheral grooves, the plunger has at least one recess provided in the middle of an outer peripheral surface thereof in its axial direction, the circulation passage connected to the fluid-sending destination is connected to a portion of the sub-cylinder between two of the annular seals on its proximal end side, the circulation passage connected to the pumping driving chamber is connected to a portion of the sub-cylinder between two of the annular seals in the middle, and the external discharge passage is connected to a portion of the sub-cylinder between two of the annular seals on its distal end side, the recess forming a gap between one of the annular seals when the plunger is located at either dead center, and the pumping driving chamber is brought into communication with the external discharge passage or the circulation passage via the gap.

2. The pump apparatus according to claim 1, wherein each annular seal is an O-ring having a circular cross section with a diameter of 1.5 to 3.5 mm, each recess has a hemispherical shape with a curvature radius of 1.5 to 4 mm, and the plunger has one to six recesses provided in circumferential direction.

3. The pump apparatus according to claim 1, wherein the connecting bar is a manual handle.

4. The pump apparatus according to claim 1, wherein the pump body provides a filter portion and a discharge passage, the filter portion including a semipermeable membrane for filtering the fluid, an unpurified-fluid containing section for containing the fluid sent from the pumping chamber and impurities remained after filtering the fluid, and a purified-fluid containing section for containing the fluid filtered through the membrane, the unpurified-fluid containing section being connected to the circulation passage and the purified-fluid containing section being connected to the discharge passage.

5. The pump apparatus according to claim 4, wherein the semipermeable membrane is a reverse osmosis membrane.

* * * * *